Figure 1:
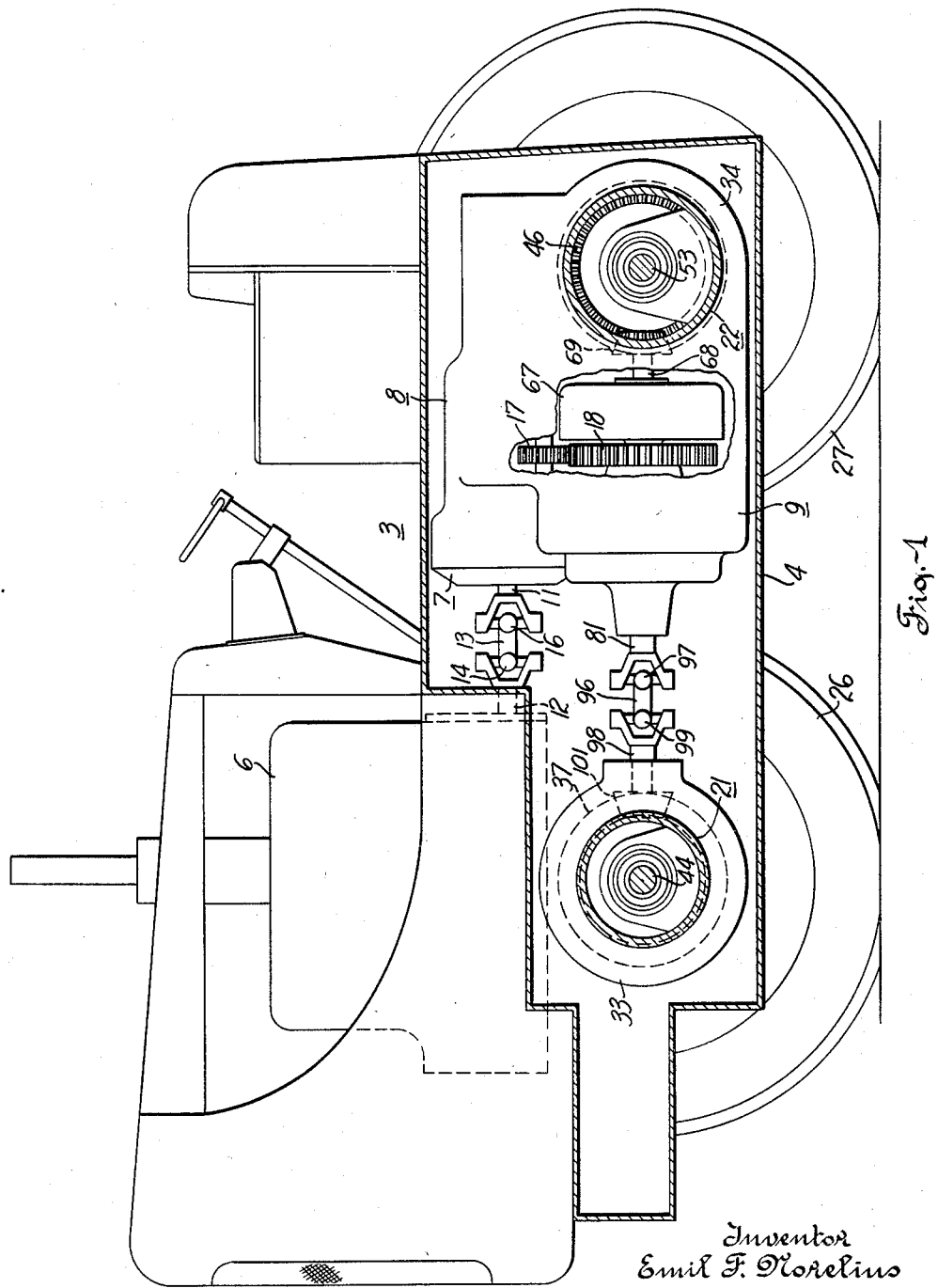

May 10, 1960

E. F. NORELIUS 2,936,036

MULTIPLE WHEEL DRIVE MECHANISM

Filed June 9, 1958

2 Sheets-Sheet 1

Inventor
Emil F. Norelius
By James O. Alfred
Attorney

May 10, 1960

E. F. NORELIUS 2,936,036

MULTIPLE WHEEL DRIVE MECHANISM

Filed June 9, 1958

2 Sheets-Sheet 2

Inventor
Emil F. Norelius
By James O. Olfson
Attorney

United States Patent Office 2,936,036
Patented May 10, 1960

2,936,036

MULTIPLE WHEEL DRIVE MECHANISM

Emil F. Norelius, Becker, Minn., assignor to Allis-Chalmers Manufacturing Company, Milwaukee, Wis.

Application June 9, 1958, Serial No. 740,909

5 Claims. (Cl. 180—49)

This invention relates generally to motor vehicles and is more particularly concerned with a multiple wheel drive mechanism for such vehicles.

In order to meet present day requirements a motor vehicle such as a four wheel, four wheel drive industrial tractor must be designed not only to handle heavy lugging assignments such as bulldozing operations and the hauling of heavy loads over difficult terrain but also must be capable of moving at high speeds over relatively smooth terrain or under conditions which do not require high traction.

It has been observed that four wheel drive is an essential feature when operating this type of tractor at low speeds and under high traction requirements; but at higher speeds when traction requirements are low, two wheel drive is entirely adequate. To accomplish the change-over from four to two wheel drive, various devices have been suggested which usually involve a special gearing arrangement that requires synchronizing or meshing of gears and also adds considerable bulk to an already crowded drive assembly.

Additional requirements for the drive assembly for this type of tractor vehicle include: differential gearing between pairs of driving wheels; suitable reduction gearing in order to provide necessary speed ranges; and simplified gear transmissions for changing to the various speed ranges, all to be incorporated into the limited space available on the tractor. Heretofore, various drive mechanisms for vehicle wheels have been suggested which attempt to consolidate the several units which make up the drive assembly. My patent U.S. 2,659,246, granted on November 17, 1953, for instance, discloses a unified tandem drive mechanism which serves both as a differential and gear reduction unit. However, not any of the prior art unified drive mechanisms have satisfactorily incorporated a simplified means for accomplishing a change-over from four to two wheel drive.

It is, therefore, an object of the present invention to provide an improved multiple wheel drive mechanism which will fulfill the requirements and overcome in an entirely satisfactory manner the disadvantages of prior art devices hereinbefore pointed out.

It is a further object of this invention to provide an improved multiple wheel drive mechanism which serves as reduction gearing, a differential and a two range transmission.

It is a further object of this invention to provide a drive mechanism providing four wheel drive at low speeds and high power requirements and two wheel drive at higher speeds and low traction requirements.

It is a further object of the present invention to provide an improved drive mechanism for a pair of vehicle wheels arranged in tandem, which will permit differential rotation of the wheels and will permit torque to be transmitted to both of said wheels simultaneously or alternatively to one of said wheels at a speed greater than under the former condition.

It is a further object of the present invention to provide a drive mechanism for a pair of tandem axle units, each mounting a pair of driving wheels, which permits differential rotation of all four wheels; serves as a two range transmission by permitting drive to be transmitted simultaneously to both of said axle units at low speed and high tractive power requirements and alternatively allows rotation to be supplied only to one of the axle units at a speed greater than under the former condition, thereby providing power requirements for high speed operation.

Figure 2:
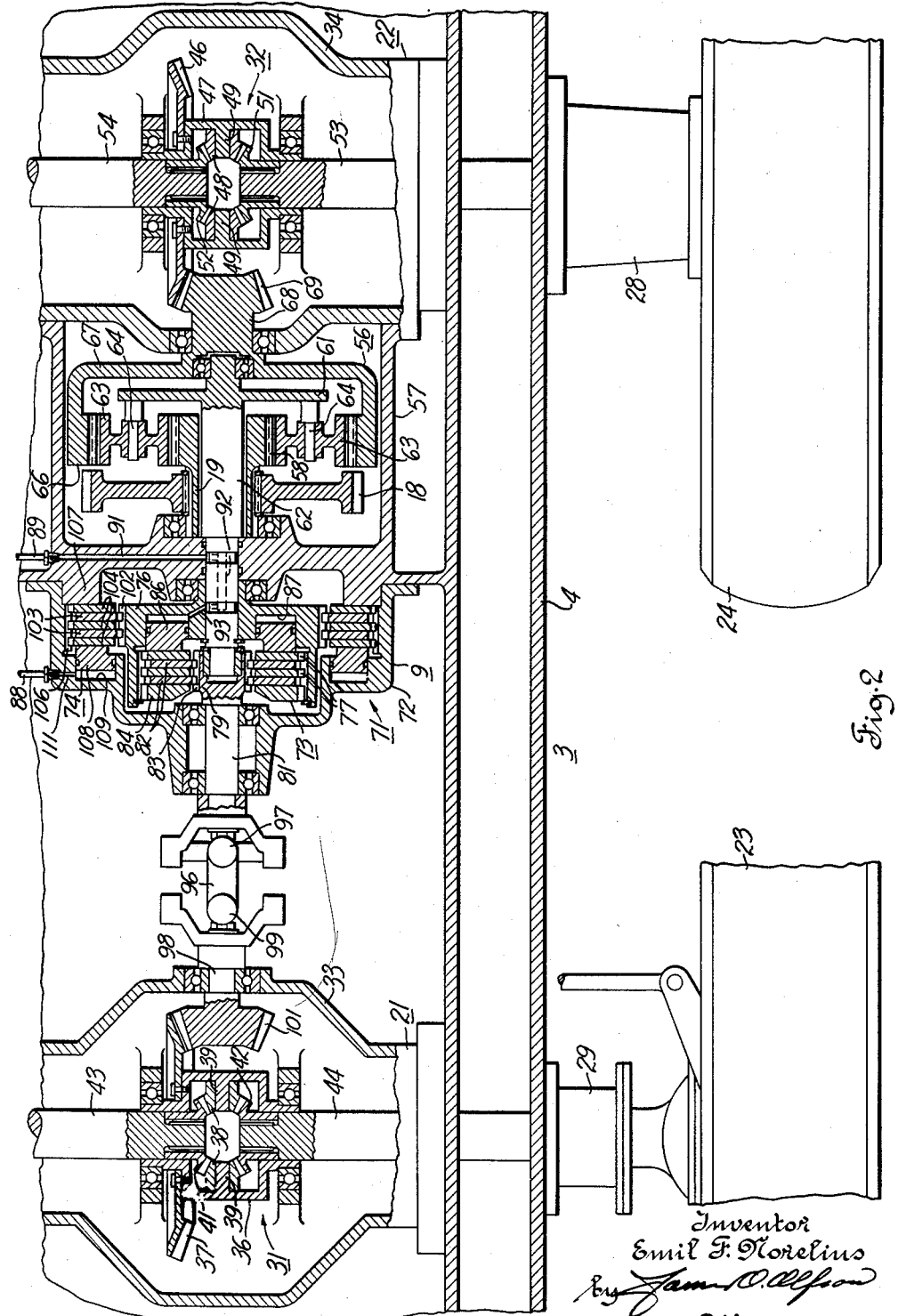

These and other objects and advantages of the invention will become apparent from the following description when read in conjunction with the accompanying drawings in which:

Fig. 1 shows a diagrammatic side view of a four wheel, four wheel drive tractor having the front and rear wheels at the near side of the tractor removed and a portion of the main frame cut away; and Fig. 2 is a top view, partially in section, diagrammatically showing the drive mechanism for a pair of tandem axle units.

Referring to Fig. 1, the industrial type four wheel, four wheel drive tractor which is indicated generally by the reference character 3, includes a main frame 4 of conventional design and construction upon which is supported an engine 6 at the forward end thereof, a torque converter indicated generally by numeral 7; a geared transmission indicated generally by numeral 8; and a drive mechanism 9. Engine 6 is drivingly connected to the torque converter input shaft 11 by means of engine shaft 12 which is connected to intermediate shaft 13 by universal joint 14 and universal joint 16 which interconnects shaft 13 to torque converter shaft 11. Transmission 8 is of conventional design and construction and may incorporate as many speed ranges as are required, receiving its power from the output member, not shown, of torque converter 7 and delivering it through any selected speed range through gear or output member 17 to gear 18 with which it is meshed. Gear 18 is splined onto quill shaft 19, shown in Fig. 2, and together they form the input member of the drive mechanism 9.

Referring to Figs. 1 and 2, a front axle unit 21 and a rear axle unit 22 are arranged in tandem on opposite ends of the main frame 4. The front and rear ground engaging driving wheels 23 and 24 are arranged in tandem on the near side of the main frame, as shown in Fig. 2; and a similar pair of front and rear driving wheels 26 and 27 are also arranged in tandem on the far side of the main frame 4, as shown in Fig. 1. Each of the rear wheels 24 and 27 form part of the rear axle unit 22 and are rotatably mounted respectively in a conventional manner upon hub sleeves which are rigidly secured onto the main frame 4 at the rear. Only one of the rear hub sleeves is shown in Fig. 2, being identified by numeral 28.

Each of the front wheels 23 and 26 are rotatably as well as steerably mounted in a conventional manner upon hub sleeves which are rigidly secured on the forward portion of the main frame 4. Only the front hub sleeve on the near side of the tractor is shown in Fig. 2, being identified by reference numeral 29. For purposes of illustrating the invention a tractor has been selected having a unitary main frame with the wheels being supported directly thereon. The manner of mounting the vehicle wheels and the suspension, however, is not intended to limit the invention as other conventional mounting systems are available; such as, the suspension system disclosed in my patent U.S. 2,614,641, granted October 21, 1952.

Referring to Fig. 2, the front and rear differential gear mechanisms 31 and 32 form part of each of the axle units 21 and 22 and are housed respectively within the casing 33 of the front axle unit and the casing 34 of the rear axle unit, both casings forming part of the main frame 4. Referring to differential mechanism 31 for the front axle unit, the planetary gearing is of conventional construction and includes a carrier 36 rotatably mounted on suitable bearings within casing 33, and having a bevel gear 37 mounted thereon. A set of planet pinion gears 38 are rotatably mounted respectively on studs 39 which are secured to the carrier 36 and are in constant mesh with half shaft gears 41 and 42 which are mounted respectively on half shafts 43 and 44. Carrier 36 in effect forms an input member and half shaft gears 41 and 42 form a pair of output members of the differential gear mechanism 31. The output members 41 and 42 are connected in driving relationship respectively with wheels 23 and 26 through half shafts 44 and 43 which are rotatably journaled within casing 33 and sleeves 29 and are to be attached at their outer ends to front wheels 23 and 26, respectively, by a suitable universal linkage of conventional design, not shown, which permits steering.

The differential gear mechanism 32 for the rear axle unit 22 is similar to differential mechanism 31 and includes a planetary gear train having a bevel gear 46 connected on a carrier 47; planet pinion gears 48 rotatably mounted on studs 49 secured to the carrier 47 and are in constant mesh with a pair of half shaft gears 51 and 52 connected respectively on half shafts 53 and 54. Output members or gears 51 and 52 are connected respectively in driving relationship with rear wheels 24 and 27, through half shafts 53 and 54 which are rotatably journaled upon suitable bearings, not shown, within casing 34 and sleeves 18 and are nonrotatably attached at their outer ends respectively to the rear wheels in a conventional manner, which connection is not shown.

The planetary gear train 56 of the drive mechanism is located within a support housing 57 which forms a part of the main frame. Planetary gear train 56 is of the spur type and includes a sun gear 58 which is formed on one end of the quill shaft 19 which is rotatably journaled on housing 57 by suitable bearings; a carrier or spider 61 which is nonrotatably carried upon one end of the output shaft 62; and a plurality of planet pinion gears, two of which are represented by reference numerals 63, are rotatably mounted respectively on studs 64 which are secured on carrier 61, the teeth of each of the planet pinion gears 63 meshing respectively with the external teeth of sun gear 58 and the internal teeth of ring gear or countergear 66. The sun gear 58, carrier 61 and the ring gear 66 form three separate relatively rotatable power transmitting elements and are preferably so constructed that the gear ratio between sun gear 58 and ring gear 66 is greater than unity at zero speed of the carrier 61. For a more complete disclosure of this type of planetary gearing and the alternative arrangements and gear ratios to be obtained therewith, reference is here made to my patent U.S. 2,659,246 granted November 17, 1953.

Power is transmitted from the drive mechanism 9 to bevel gear 46 on carrier 47 of the rear axle unit by ring gear 66 which is drivingly connected thereto by a driving means which includes drum 67 upon which ring gear 66 is mounted; output shaft 68; and bevel pinion gear 69 which is nonrotatably carried upon the axially outer end of shaft 68, gear 69 being in mesh with bevel gear 46.

Carrier 61 transmits driving power to the front axle unit 21 through a composite clutch and brake mechanism which is diagrammatically illustrated in Fig. 2 and is identified by reference numeral 71. Mechanism 71 is located within a casing 72 which is rigidly secured to housing 57, and includes a clutch unit being identified by numeral 73 and a brake unit identified by numeral 74. Clutch unit 73 includes a driving drum 76 which is nonrotatably secured to shaft 62 and carries a plurality of single disks 77 having a series of external teeth which are drivingly engaged by axially extending splines formed circumferentially about the interior of drum 76. Driving drum 76 surrounds a driven drum 79 which is secured upon line shaft 81. Driven drum 79 carries a set of clutch disks 82 having a series of internal teeth which are drivingly engaged by axially extending splines 83 formed circumferentially upon the outside surface of drum 79. Disks 77 and 82 are to be alternately stacked in the conventional manner intermediate a backup plate 84 carried on drum 76 and an annular piston 86 carried in a cylinder 87 provided in the driving drum 76. Axial pressure for compressing the stack of disks 77 and 82 and maintaining them in torque transmitting engagement is supplied by piston 86. Hydraulic pressure to actuate piston 86 is provided by an engine driven hydraulic pump of conventional type, not shown, and delivered through suitable control valves, not shown, through conduits 88 and 89, respectively. Conduit 89 communicates with cylinder 87 through opening 91 provided in housing 57 and through opening 92 in shaft 62 and thence through opening 93 provided in the driving drum 76. The driven drum 79 of mechanism 71 is connected in torque transmitting relationship with the carrier or input member 36 of the front differential gear mechanism 31, through shaft 81 and intermediate shaft 96, which are interconnected at axially adjacent ends by a universal joint 97, through drive shaft 98 being interconnected at one axial end by a universal joint 99 to the adjacent axial end of shaft 96 and bevel pinion 101, which is nonrotatably carried on the axially outer end of shaft 98 being in constant mesh with gear 37. In effect shaft 62, clutch unit 73, shaft 81, universal joint 97, shaft 96, universal joint 99, shaft 98 and bevel pinion 101 serve as a power rtansmitting means for connecting the planetary gear train 56 in driving relation with the front axle unit 21.

Brake unit 74 shares driving drum 76 with clutch unit 73. On the outside surface of driving drum 76 is formed a circumferential series of axially extending splines 102 upon which are carried a set of clutch disks 103 having a series of internal teeth which are drivingly engaged by the splines 102. Surrounding the driving drum and disks 103 is a portion of casing 72 which nonrotatably carries a set of clutch disks comprising a plurality of single friction disks 104 having external teeth which are nonrotatably engaged by axially extending splines 106 formed circumferentially upon the inside of the casing 72. Disks 103 and 104 are to be alternately stacked in the conventional manner intermediate a backup member 107, formed on the housing 57, and an annular piston 108 carried in a cylinder 109 provided in the casing 72, which furnishes axial pressure for compressing the stack of clutch disks 103 and 104 and maintaining them in nonrotatable engagement. Hydraulic pressure to actuate piston 108 is supplied through conduit 88 which communicates with opening 111 provided in casing 72 and thence into cylinder 109.

It will be noted that clutch unit 73 in effect serves as a freewheel clutch for alternatively establishing and interrupting the drive between the carrier 61 of planetary gearing 56 and the front axle unit 21. Brake unit 74 on the other hand serves as a locking unit for holding carrier 61 out of rotation.

*Operation*

In the four wheel drive condition, propelling power is supplied to the drive mechanism 9 from engine 6 through torque converter 7 and transmission 8 and thence to sun gear 58 which serves as an input power transmitting element of the planetary gear train 56. Carrier 61 and countergear 66 serve respectively as output power transmitting elements for the planetary gear train 56. Drum 67, drive shaft 68, pinion 69, differential gearing 32 and half shafts 53 and 54 are effective as a torque transmitting means for connection the ring gear or output element 66 with the rear wheels 24 and 27. Drive to the front wheels is obtained by directing hydraulic pressure under proper control through openings 91, 92 and 93 into cylinder 87 thereby forcing the annular piston 86 against the clutch disks 77 and 82 which are forced up against backup plate 84 thereby causing shaft 62 to be drivingly connected with shaft 81. In this condition it will be readily seen that half shafts 43 and 44, differential gearing 31, bevel pinion 101, shaft 98, universal joint 99, intermediate shaft 96, universal joint 97, shaft 81, clutch unit 73 and shaft 62 in effect serve as a second torque transmitting means for interconnecting the front wheels 23 and 26 and the carrier 61 or second output element of the planetary gear train 56.

Planetary gear train 56 is of such a type that the torque transmitted to shaft 98 from carrier 61 for the front axle unit 21 is greater than that transmitted to shaft 68 for the rear axle unit 22. Therefore, in order to obtain equal rim pull at all four wheels during the four wheel drive condition, it is necessary to have an axle ratio at the front axles 43 and 44 which is slightly less than at the rear axles. This may be accomplished in the well known manner by varying the number of teeth in the bevel pinion 101 and bevel gear 37. Also to insure better operation on curves and to compensate for the fact that the wheels may not be of the same diameter, due to uneven wear or difference of air pressure which frequently occurs with rubber tires, the differentials 31 and 32, respectively, allow the propelling power to be equalized between wheels 23 and 26, and 24 and 27; and planetary gearing 56 serves as an additional differential between each of the axle units 21 and 22 whereby differential action is effectively provided between all four driving wheels.

In order to minimize the tendency of any three of the wheels becoming stationary when the fourth wheel loses its resistance tending to absorb the entire propelling torque, it may be desirable to incorporate into the differentials some of the well known torque proportioning features and thereby limit to a suitable degree the so-called free differential operation.

It is considered that four wheel drive is an essential feature when traveling at low speeds and developing high traction, but at higher speeds when high traction is not essential such as when traveling over reasonable terrain or when engaged in a distinct hauling operation, two wheel drive is entirely adequate. The conversion from a four wheel drive to a two wheel drive is easily obtained by simply disengaging clutch 73, allowing front wheels 23 and 26 to freewheel, and alternatively holding the driving drum 76 from rotation by actuating brake 74. This is accomplished by allowing oil pressure under proper control to enter cylinder 109 through opening 111 forcing annular piston 108 against the clutch disks 103 and 104 which are forced up against the backup plate 107. This operation in effect locks the carrier or output element 61 to casing 72; the tractor is now converted from a four wheel to a two wheel drive; the normal speed delivered to the rear wheels is doubled; and the planetary gearing 56 for all practical purposes has functioned as a two speed transmission. This is so because the axle ratios at the front and rear axles have been designed so as to produce the condition of equal rim pull at all wheels so that in the two wheel drive condition drive is transmitted from sun gear 58 to rear axles 53 and 54 whereas in the normal four wheel drive condition one-half of the drive is transmitted to front axles 43 and 44 from the carrier 61 which is rotating in a direction opposite to that of ring gear 66 which operation is well known.

The drive mechanism described herein provides an extremely flexible structure; for example, if it is desired to use smaller wheels at the front of the tractor, equal rim pull on all the wheels may be obtained by simply decreasing the axle ratio at the front axles by an additional amount. If on the other hand the load imposed on the front axle is less than that on the rear axle and it is desired to balance rim pull to the load imposed, this may also be acomplished by effecting an additional reduction in gear ratio at the front axles. In this condition it will be obvious when the drive is changed from four wheel to two wheel, the speed of the tractor will be increased by an amount less than twice the speed as against the speed obtainable in four wheel drive.

From the foregoing description it will be apparent that a novel drive mechanism has been illustrated which when combined with a pair of tandem axle units delivers propelling power to both axle units simultaneously or to only one axle unit at twice the speed as under the former condition. In other words the tractor may be considered to have been converted from a high traction unit to a high speed hauling unit. The planetary gear train of the drive mechanism serves as a reduction gearing, a differential and as a two range transmission when changing over from a four wheel to a two wheel drive.

Although this invetnion has been illustrated with a four wheel drive tractor having steerable wheels, it is not intended to be limited thereto as any suitable steering by driving mechanism of the type used in some other conventional four wheel drive vehicles may also be used. For instance, it will be apparent that the present invention may be readily incorporated into the type of drive mechanism shown in my patent U.S. 2,659,246 which has previously been mentioned.

It should be understood further that it is not intended to limit any patent granted hereon otherwise than is necessitated by the scope of the appended claims.

What is claimed is:

1. In a motor vehicle a multiple wheel drive mechanism the combination comprising: a pair of driving wheels mounted on said motor vehicle for rotation on axes extending transversely of said vehicle and spaced longitudinally of each other with respect to the longitudinal axis of the vehicle; a support; a planetary gear train mounted on said support including a sun gear, a countergear, and a carrier interconnected respectively by planet pinion means mounted on said carrier, said countergear, sun gear and carrier serving as three relatively rotatable power transmitting elements and are so constructed that the gear ratio between any two of said power transmitting elements is different from unity at zero speed of the other power transmitting element; a power input means connected in driving relation to one of said power transmitting elements; a first torque transmitting means for interconnecting a second of said power transmitting elements in driving relation with one of said driving wheels; a second torque transmitting means for interconnecting the third of said power transmitting elements in driving relation with the other of said driving wheels, said second torque transmitting means including a clutch means for interrupting and establishing the drive to said other driving wheel from said third power transmitting element; and brake means associated with said support and said second torque transmitting means for locking said third power transmitting element out of rotation upon interruption of drive to said other driving wheel whereby torque is transmitted to said one driving wheel.

2. In a motor vehicle a drive mechanism for a pair of tandem axle units the combination comprising: a differential gear mechanism for each of said axle units; a support; a planetary gear train mounted on said support including a sun gear, a countergear, and a carrier interconnected respectively by planet pinion means mounted on said carrier, said countergear, sun gear and carrier serving as three relatively rotatable power transmitting elements, and are so constructed that the gear ratio between any two of said power transmitting elements is different from unity at zero speed of the other power transmitting element; a power input means connected in driving relation to one of said power transmitting elements; a first means for interconnecting a second of said power transmitting elements in driving relation with one of said differential gear mechanisms; a second means independent of said first means for interconnecting the third of said power transmitting elements in driving relation with the other of said differential gear mechanisms, said second means including clutch means for establishing and interrupting the drive to said other differential gear mechanism from said second power transmitting element; a brake means associated with said support for holding said third power transmitting element out of rotation upon interruption of drive to said other differential gear mechanism whereby rotation is transmitted to said one differential gear mechanism at a greater rate of speed than under the condition when there is a driving connection to both of said differential gear mechanisms.

3. In a motor vehicle a four wheel drive mechanism the combination comprising: a pair of tandem axle units attached on said motor vehicle; each of said axle units including a differential gear mechanism having an input member and a pair of output members, said output members connected in driving relation respectively with a pair of rotatable half shafts; a driven ground engaging wheel connected with each of said half shafts; a planetary gear train mounted on said support including a sun gear, a countergear, and a carrier interconnected respectively by planet pinion means mounted on said carrier, said countergear, sun gear and carrier serving as three separate relatively rotatable power transmitting elements and are so constructed that the gear ratio between the sun gear and the countergear is greater than unit at zero speed of the carrier; a power input means connected in driving relation to said sun gear; a first means for interconnecting said countergear with the input member of one of said differential gear mechanisms; a second means independent of said first means for interconnecting the carrier in driving relation with the input member of the other of said differential gear mechanisms, said second means including a clutch means for establishing and interrupting the drive to said other differential gear mechanism; and a brake means associated with said clutch means and with said support for locking said carrier out of rotation upon interruption of drive to said other differential gear mechanism whereby rotation is transmitted only by said countergear to the said other differential gear mechanism.

4. In a motor vehicle of the type having a main frame, a four wheel drive mechanism the combination comprising a pair of tandem axle units connected on said main frame, each of said axle units including a differential gear mechanism having an input member and a pair of output members, said output members being connected in driving relation respectively with a pair of rotatable half shafts; means for drivingly connecting each of said half shafts to a ground engaging wheel, a support secured on said main frame; a planetary gear train mounted on said support including a sun gear, a countergear, and a carrier interconnected respectively by planet pinion means mounted on said carrier, said countergear, sun gear and carrier serving as three separate relatively rotatable power transmitting elements, and are so constructed that the gear ratio between said carrier and countergear is different from unity at zero speed of said sun gear; a power input means connected in driving relation to said sun gear; a first and second means for independently connecting said countergear and carrier in driving relation respectively with said input member of each of said differential gear mechanisms to obtain a four wheel drive, said second means including a clutch means for establishing and interrupting the drive to the said differential gear mechanisms associated with said carrier; and a brake means associated with said support and said clutch means for locking said carrier out of rotation upon interruption of drive from said carrier whereby rotation is transmitted only by said countergear to the said differential gear mechanisms with which it is connected to obtain a two wheel drive.

5. In a motor vehicle of the type having a unitary main frame, a four wheel drive mechanism the combination comprising: front and rear axle units arranged in tandem being connected respectively on said main frame, each of said axle units including a differential gear mechanism having an input member and a pair of output members, said output members connected in driving relation respectively with a pair of rotatable half shafts; means for drivingly connecting each of said half shafts respectively with a ground engaging wheel; a support carried on said main frame; a spur type planetary gear train mounted on said support including a sun gear, a ring gear, and a carrier being interconnected respectively by planet pinion means mounted on said carrier, said ring gear, sun gear and carrier serving as three separate relatively rotatable power transmitting elements, and are so constructed that the gear ratio between said sun gear and ring gear is greater than unity at zero speed of said carrier; a power input means connected in driving relation to said sun gear; a first means for connecting said ring gear in driving relationship with the input member of said differential gear mechanism of said rear axle unit; a second means independent of said first means for connecting said carrier in driving relationship with the input member of said differential gear mechanism of said front axle unit to obtain a four wheel drive, said second means including a multiple disk clutch means having a driving drum connected to said carrier and a driven drum connected to said front differential gear mechanism; engageable friction members respectively associated with said driving and driven drums for establishing and interrupting the drive from said carrier; and a brake means including engageable friction members associated respectively with said support and said driving drum for holding said carrier out of rotation upon interruption of drive to the front differential mechanism whereby propelling power is transmitted only by said ring gear to the differential gear mechanism of the rear axle unit to obtain a two wheel drive at a greater rate of speed than is obtainable under the four wheel drive condition.

References Cited in the file of this patent

UNITED STATES PATENTS

| | | |
|---|---|---|
| 1,294,198 | Timberlake | Feb. 11, 1919 |
| 2,574,986 | Schou | Nov. 13, 1951 |
| 2,659,246 | Norelius | Nov. 17, 1953 |
| 2,719,442 | O'Leary | Oct. 4, 1955 |